Nov. 1, 1966

A. O. NICCOLLS 3,282,186

CAMERA LENS SYSTEM

Filed Nov. 9, 1962

INVENTOR
Angus O. Niccolls

BY

ATTORNEY

INVENTOR
Angus O. Niccolls

BY

ATTORNEY

Nov. 1, 1966          A. O. NICCOLLS          3,282,186
                     CAMERA LENS SYSTEM
Filed Nov. 9, 1962                      3 Sheets-Sheet 3

INVENTOR
Angus O. Niccolls

BY *[signature]*

ATTORNEY

United States Patent Office 3,282,186
Patented Nov. 1, 1966

3,282,186
CAMERA LENS SYSTEM
Angus O. Niccolls, Dallas, Tex., assignor of twenty-five percent to Giles C. Clegg, Jr., Dallas, Tex.
Filed Nov. 9, 1962, Ser. No. 236,639
8 Claims. (Cl. 95—38)

The present invention relates to a lens system for use with photographic cameras and more particularly to a camera lens system especially adapted for providing several independent images on the same photographic plate or frame of film.

It is oftentimes desirable to produce a plurality of images on a single photographic plate. Thus, for example, in those instances wherein transparencies suitable for projection are formed utilizing photographic processes, the size of the transparent image is not of great importance. If a plurality of images can be formed on a single photographic plate, the cost of individual images will be reduced considerably. In addition, the projection of the images is facilitated as a projector which indexes over each of the images automatically can be utilized rather than positioning and removing a succession of individual plates.

The present invention is especially useful in those applications wherein the film used is quite expensive, such as, for example, those films which can be developed immediately upon exposure of a frame whereby the results of the photographer's efforts can be viewed immediately. Most such films are somewhat more expensive than the standard photographic films, and the desirability of obtaining several images on a single photographic plate is obvious when it is considered that the cost of each image is reduced considerably.

In accordance with the present invention, a shutter which may be of any conventional type is provided for momentarily admitting light to the film for purposes of creating a photographic image on the film. Optical means are provided for displacing the light passing through the shutter from the axis of the shutter, and means are provided for rotating the optical means. As the optical means is rotated and the shutter is opened at desired times, a plurality of images are formed. The images are arranged in a generally circular configuration. Each of the images formed is aligned in a common direction. Means are also provided for indexing the optical means as it is rotated to expose a desired area of the film, and means are also provided for indicating the position of the optical means whereby the position of the image on the photographic plate can be related to the particular subject matter being photographed. Suitable masking means can be provided for defining the shape of the image produced each time and preventing undesired portions of the photographic plate being exposed as each image is produced.

According to one specific embodiment of the invention, two prisms are mounted in a plane normal to the axis of the shutter, one of the prisms being aligned with the axis of the shutter. The optical image transmitted through the shutter is thereby displaced an amount equal to the separation between the two prisms. As the optical means comprising the two prisms is pivotally rotated about the axis of the shutter, the images produced on the photographic plate as the optical means is rotated and the shutter is opened define a circle of radius equal to the separation between the two prisms. A masking plate containing a plurality of exposure openings arranged in a circle is utilized. Each time the rotatable optical means is indexed, it aligns with an adjacent exposure opening in the mask.

According to a second embodiment of the invention, a mask is attached to the second prism and is carried by the second prism as the optical means is rotated. The mask may be rotatable whereby it turns as the optical means is rotated such that the areas defined on the photographic plate will be aligned in a common direction facilitating the projection or viewing of the images.

The lens system provided by the present invention can be of either fixed or variable focal length. If a fixed focus system, as would be suitable for making microfilms of printed matter, is used, the object lens can be positioned to provide the desired focal length. Thus, for example, the lens may be between the two prisms or in front of the shutter. If the focus of the camera is to be variable, it is preferred that the object lens be positioned in front of the shutter, as is common in the art, to facilitate adjustment of the focal length.

Many objects and advantages of the invention will become apparent to those skilled in the art as the following detailed description of the same unfolds when taken in conjunction with the appended drawings wherein like reference numerals denote like parts and in which.

Figure 1:
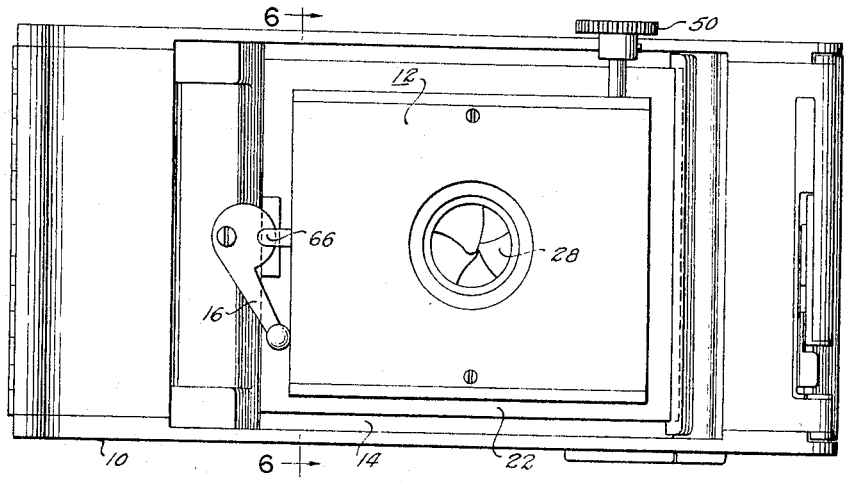
FIGURE 1 is a plan view illustrating a lens system provided according to one preferred embodiment of the present invention in combination with a camera back for supporting a roll of film.

Turning now to FIGURE 1 of the drawings, there is shown a camera back 10 such as is normally associated with a camera of the type adapted for developing the film and providing prints immediately following the exposure of a frame of film. The lens system provided by the present invention is especially useful in conjunction with such a camera back in view of the increased cost, as compared with other film processes, of film that is capable of being developed and printed within the camera as each frame is exposed. However, the present invention can advantageously be used in conjunction with any type film carrying system and any type film in those applications wherein it is desirable to obtain the maximum number of images on each frame of film and the size of the images is not critical.

The lens system provided by the present invention is denoted by the reference numeral 12. A casting 14 is fitted to the camera back 10 for supporting the lens system 12 in light sealing relationship to the camera back 10. The lens system 12 may be removably mounted to the camera back 10 by swing latch 16 as shown.

Figure 2:
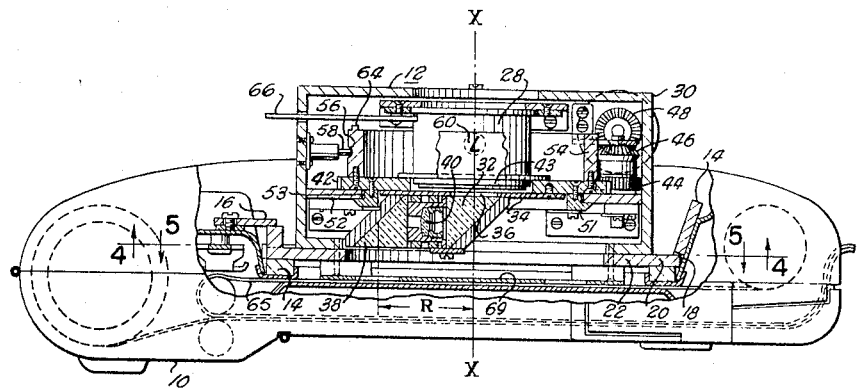
FIGURE 2 is the front elevation view of the combination shown in FIGURE 1 with a portion of the cover broken away to illustrate the mechanism provided according to one embodiment of the invention.
Figure 4:
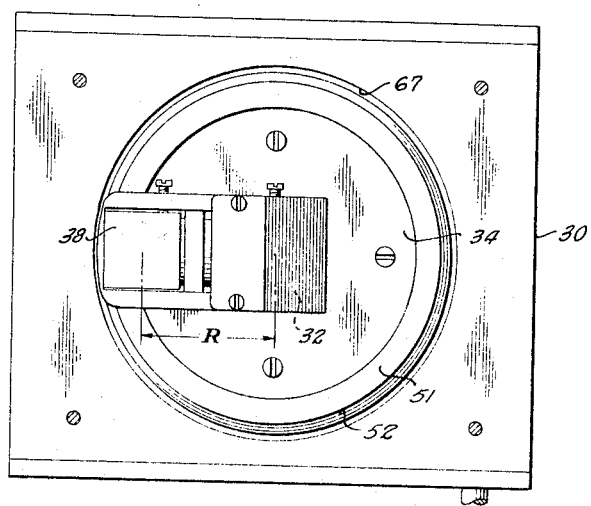
FIGURE 4 is a view taken along line 4—4 of FIGURE 2 illustrating a portion of a lens system according to one embodiment of the present invention.
Figure 6:
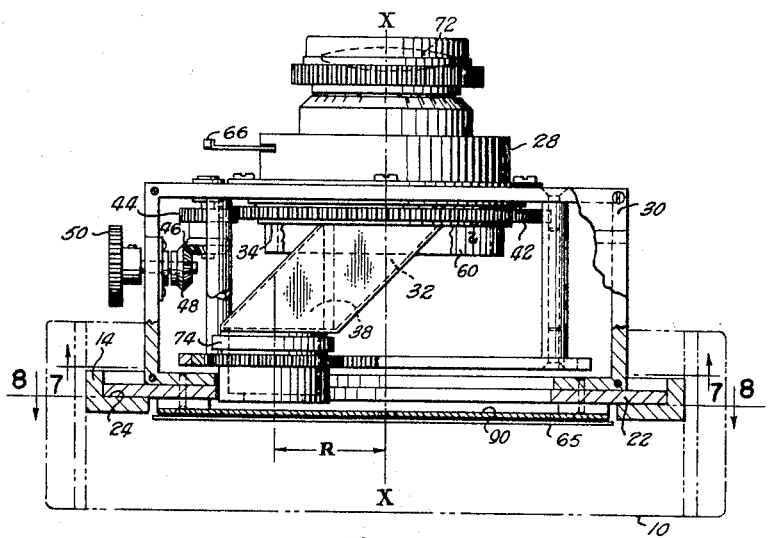
FIGURE 6 is a view taken along line 6—6 of FIGURE 1 but illustrating a second embodiment of the present invention.
Figure 7:
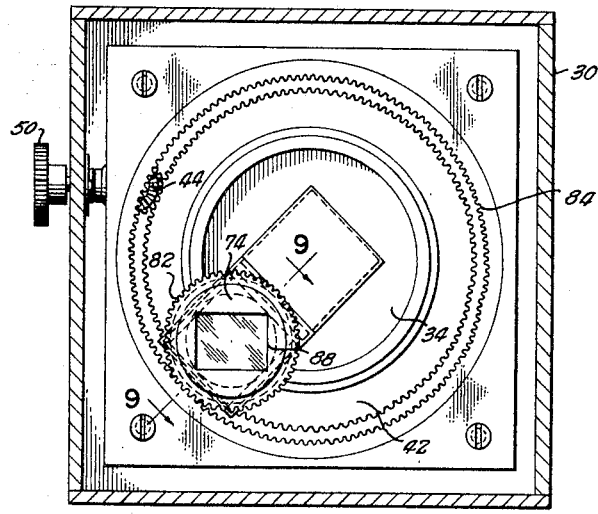
FIGURE 7 is a view taken along line 7—7 of FIGURE 6 and illustrating a different type of masking arrangement that can be used in practicing the invention.

As best seen in FIGURE 2, the casting 14 defines a slot 18 in which an end portion 20 of the mounting plate 22 fits. The opposite end of the mounting plate 22 rests upon the casting and is held in position by the swing latch 16 as shown. The side portion of the casting 14 is formed to define a recess 24 as best seen in FIGURE 6, providing a mounting in which the lens system 12 provided by the present invention is securely attached to the camera back 10 in light sealing relationship.

Returning to FIGURE 2, the lens system provided by the present invention includes a shutter 28 mounted in fixed relationship to the case 30 which houses the lens system provided by the present invention. A first prism 32 mounted on a plate 34 is also provided. The light passing through the shutter 28 is directed through the aperture 36 in the plate 34 to the prism. Also mounted on the plate 34 in spaced apart relation to the first prism 32 is a second prism 38. It is seen that the plate 34 is positioned in a plane normal to the axis X—X of the shutter 28 and that the light passing through the shutter 28 is displaced by the prisms 32 and 38 a distance R corresponding to the distance between the two prisms 32 and 38. Other optical means may be utilized for displacing the light passing through the shutter 28 such as, for example, a mirror or other light reflecting surface positioned in a plane extending obliquely across the axis X—X of the shutter 28.

An objective lens 40 is provided for focusing the image carried by the light passing through the shutter 28. The lens 40 may be positioned between the prisms 32 and 38 as shown, or the lens may be positioned at any other desired location in the optical system, as for example, between the shutter and the first prism or following the second prism or before the shutter. The exact location of the lens will, of course, depend upon the desired focal length of the camera lens system.

The plate 34 which supports the prisms 32 and 38 is mounted to an annular gear 42 having an opening 43 to permit passage of light from the shutter 28 to the prism 32. The axis of the gear 42 is aligned with the axis X—X of the shutter 28. The gear 42 is driven by a pinion 44 and beveled gears 46 and 48 as the knurled knob 50 is turned. In the form illustrated, one side of the gear 42 and the annular plate 51 define a circular rim 53 in which the plate 52 provided with a circular opening fits. The plate 52 supports the gear 42 for rotation and maintains the desired alignment between the axis of the shutter 28 and the prism 32. As the gear 42 is rotated by turning the knob 50, the prisms 32 and 38 and the lens 40 pivotally rotate about the axis X—X of the shutter 28, causing the prism 38 to traverse a circle of radius R.

Figure 3:
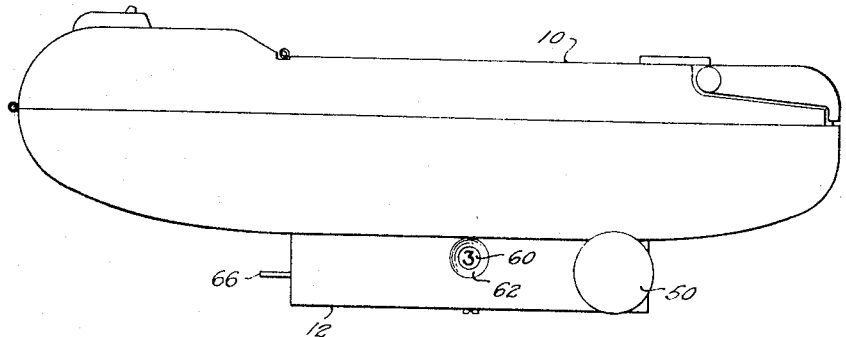
FIGURE 3 is a rear elevation view of the combination shown in FIGURE 1 illustrating the means for indicating the position of the rotatable optical means.

An annular ring member 54 is suitably provided with a plurality of depressions 56 into which a spring biased pin 58 falls as the knob 50 is turned to index the rotatable gear 42 a predetermined amount. A plurality of numerals or other indicia 60 may be printed on the surface of the ring member 54. The indicia 60 can be viewed through an opening 62 in the case assembly 40 (FIGURE 3) for purposes of indicating the location of the optical system. Also, if desired, a plurality of pin like protrusions 64 may be provided in the upper edge of the ring member 54 for engaging a shutter cocking mechanism (not shown) to cock the shutter 28 as the gear 42 is caused to rotate. By providing a cocking mechanism that is responsive only to the gear 42 being indexed a predetermined amount, the possibility of double exposure of a particular portion of the film 65 is minimized. The shutter arm 66 is provided for opening the shutter 28 to momentarily allow light to be admitted into the camera case. Alternatively, a cable arrangement of the type conventional in the art can be utilized for releasing the shutter 28.

The mounting plate 22 is provided with a circular opening 67 of a diameter equal to the diameter of the circle traversed by the outer edge of the prism 38 as shown. All of the light reflected by the prism 38 when the shutter 28 is open, is thus applied to the area of the film 65 underlying the prism 38.

Positioned below the mounting plate 22 and closely adjacent to the film 65 is a mask 69 that is provided with a plurality of exposure openings 68 of desired size and shape. The geometric centers of the exposure openings 68 define a circle of radius R that corresponds to the spacing between the prisms 32 and 38 and whose center is aligned with the axis X—X of shutter 28. Thus, as the gear 42 is rotated by turning the knob 50, the prism 38 will traverse a path parallel to the circle defined by the geometric centers of the exposure openings 68. The spring biased pin 58 and the depressions 56 are effective to index the gear 42 such that the prism 38 will be aligned with one of the exposure openings 68 in the mask 69. If the shutter is opened momentarily, light is transmitted through the shutter 28, the two prisms 32 and 38, the lens 40, and one of the openings 68 in the mask 69 to the film 65. Only that portion of the film 65 underlying the exposure opening 68 which is aligned with the prism 38 will be exposed, allowing a plurality of images to be formed on a single frame of film. The plurality of images are formed on the film in a predetermined geometric configuration that conforms to the shape and location of the exposure opening 68 in the mask 69.

Figure 5:
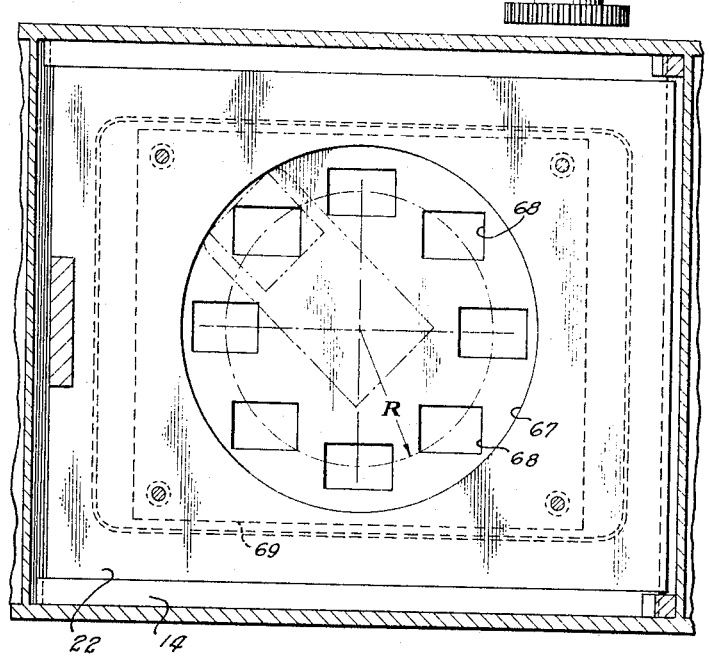
FIGURE 5 is a view taken along line 5—5 of FIGURE 2 and illustrating a mask of the type suitable for use in practicing the present invention.

Excellent results have been obtained utilizing a mask of the type shown in FIGURES 2 and 5. However, due to the separation between the mask 69 and the prism 38, the openings 68 must be separated a sufficient amount that when the prism 38 is aligned with one of the openings 68 in the mask and the shutter 28 is opened momentarily, diffusion of the light reflected from the prism 38 will not expose undesired portions of the film through other of the exposure openings.

FIGURES 6 through 9 illustrate a second embodiment of the invention wherein a tubular mask is provided in conjunction with the prism 38 for purposes of minimizing the possibility of exposing undesired portions of the film. It has been found that by using the masking arrangement shown in this second embodiment of the invention, multiple images can be formed on a single frame of film in very close spaced relation to one another.

As shown in FIGURE 6, according to this second embodiment of the invention, the rotatable optical means for displacing the light is positioned within the case 30. The shutter 28 is mounted externally and the focusing lens 72 is positioned between the shutter and the object to be photographed.

The lens shown in FIGURES 1 through 5 of the drawings is of the fixed focus type and is suitable for making microfilm or transparencies of pages of books and other items in which the camera is conveniently positioned a known fixed distance from the object to be photographed. In the embodiment of the invention shown in FIGURE 6, a variable focus lens 72 is provided in which the focal length of the camera may be adjusted dependent upon the distance of the object to be photographed.

As described with reference to FIGURES 1 through 5, the prisms 32 and 38 are attached to the rotatable gear 42 by plate 34. The gear 42 is driven through the gear train comprising the pinion 44 and the beveled gears 46 and 48 responsive to the turning of the knob 50 as described before, causing the prism 38 to traverse a circle.

Figure 9:
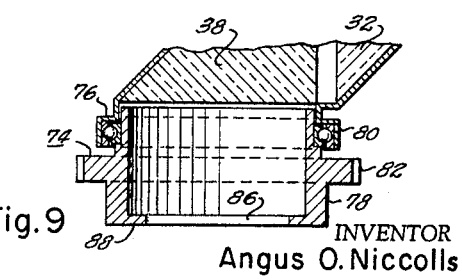
FIGURE 9 is a cross sectional view taken along line 9—9 of FIGURE 7 illustrating the constructional details of the mask shown in FIGURE 7.

A tubular mask denoted generally by the reference character 74 is attached to the prism 38 to receive the light reflected by the prism 38. As best seen in FIGURE 9, the tubular mask preferably comprises a portion 76 attached to the prism 38 and a rotatable portion 78 connected to the fixed portion by a ring joint 80. An annular gear 82 which engages a ring gear 84 is attached to the rotatable portion 78 as shown. An exposure opening 86 of desired size and configuration is defined in the end 88 of the rotatable portion 78 of the mask 74. As the prism 38 is caused to traverse a circle responsive to turning of the knob 50, the ring gear 84 and gear 82 cooperate to cause the rotatable portion 78 to turn and maintain the exposure opening 86 aligned in a desired direction regardless of the position of the prism 38.

The length of the tubular mask 74 may be such that the exposure opening 86 will be closely adjacent to the film in which event the substantially flat mask 90 is not an essential element. Good results have been obtained by constructing the lens system such that the tubular mask extends to the lower surface of the mounting plate 41. It will be appreciated that by positioning the lower surface 88 of the tubular mask 74 against the film or closely adjacent thereto, the necessity for another mask is obviated as it is possible to very severely restrict the portion of the film exposed and thus obtain images on a frame of film that are quite close together.

Figure 8:
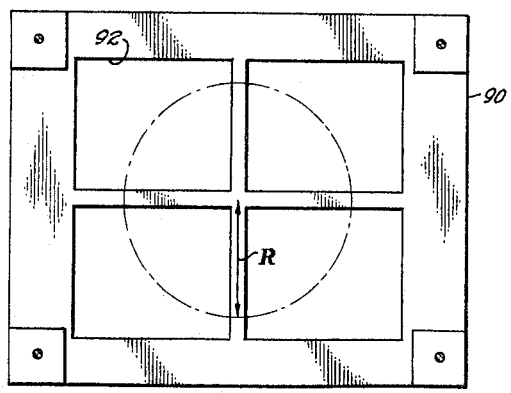
FIGURE 8 is a view similar to FIGURE 5 but illustrating the different mask configuration.

The additional substantially flat mask 90 appears to be advantageous principally when it is desired to provide images of substantially greater size than the exposure opening 86 in the mask 74. The size of the exposed area on the film 65 can, of course, be controlled by varying the separation between the mask 74 and the mask 90 and the separation between the face of the prism 38 and the opening 86, in conjunction with the shape and location of the objective lens 30. FIGURE 8 illustrates the manner in which the mask 90 may define fewer openings 92 of larger size.

From the above, it is apparent that the present invention provides an improved lens system whereby a plurality of images can be obtained on a single frame of photographic film. The present invention can be practiced by providing an attachment for use with a separate film carrying camera back, or the lens system of the present invention can be incorporated into a unitary camera structure.

In practicing the present invention, optical means are provided for displacing the light passing through the shutter of the camera a predetermined amount. The optical means provided according to a preferred embodiment of the invention comprises a pair of prisms mounted in a plane normal to the axis of the shutter, the reflective surface of one of the prisms being in a plane extending obliquely across the extended optical axis of the shutter and the reflective surface of the second prism being opposed to and parallel to the reflective surface of the first prism. The optical means is mounted for pivotable rotation about the axis of the shutter such that the second prism traverses a circle as it is rotated.

Masking means are provided for cooperating with the optical means to define a restricted area on the sensitive surface of the frame of film that is exposed as the shutter is momentarily opened. The masking means may suitably comprise a substantially flat plate having a plurality of exposure openings formed therein or a tubular mask that extends from the optical means to near the surface of the film may be provided, an aperture being formed in the tubular mask for defining the area of the film to be exposed. The tubular mask connected to the optical means may be of either fixed type or rotatable. The rotatable mask incorporates the advantage of maintaining a common alignment between each of the images formed on the surface of each frame of film. If desired, a combination of masks may be utilized to provide and control the size of the images produced on the frame of film. If desired, means can be provided for indexing the optical means to desired locations and indicating the position of the optical means whereby the position of an image on a frame of film can be related to a particular object being photographed.

Although the invention has been described with regard to certain preferred embodiments, it is to be understood that many changes, modifications and improvements will be obvious to those skilled in the art and the invention is to be limited only as necessitated by the scope of the appended claims.

What I claim is:
1. A camera lens system that comprises:
 (a) a shutter;
 (b) means for momentarily opening said shutter to permit image transmitting light waves to impinge upon the sensitized surface of a frame of film;
 (c) optical means positioned between said shutter and said film for displacing the light waves from the axis of the shutter;
 (d) said optical means including a first reflective device having a first reflective surface positioned in a plane extending obliquely across the axis of said shutter and a second reflective device having a second reflective surface in parallel, opposed, spaced apart relationship to said first reflective surface;
 (e) masking means cooperating with said optical means to restrict the area of a frame of film exposed when said shutter is open;
 (f) means for pivotably rotating said optical means about the axis of said shutter;
 (g) said last named means including a circular gear having an aperture through which said light waves pass, means attaching said optical system to said circular gear and gear drive means for rotating said circular gear;
 (h) means to index said optical system as it is rotated;
 (i) means to indicate the angular position of said optical system as said optical system is rotated to different index positions; and
 (j) means effective responsive to rotation of said optical system for cocking said shutter.

2. A camera lens system that comprises:
 (a) a shutter;
 (b) means for momentarily opening said shutter to permit image transmitting light waves to impinge upon the sensitized surface of a frame of film;
 (c) optical means positioned between said shutter and said film for displacing light waves from the axis of the shutter;
 (d) said optical means including a first reflective device having a first reflective surface positioned in a plane extending obliquely across the axis of said shutter and a second reflective device having a second reflective surface in parallel, opposed, spaced apart relationship to said first reflective surface;
 (e) means for pivotably rotating said optical means about the axis of said shutter;
 (f) said last named means including a circular gear having an aperture through which said light waves pass, means attaching said optical system to said circular gear and gear drive means for rotating said circular gear;
 (g) means to index said optical system as it is rotated;
 (h) means to indicate the angular position of said optical system as said optical system is rotated to different index positions;
 (i) masking means cooperating with said optical means to restrict the area of a frame of film exposed when said shutter is open;
 (j) said masking means including a tubular member having a noncircular aperture of desired size and configuration defined in one end thereof and mounting means mounting said tubular member to continually receive light reflected by the second reflective surface of said second reflective device when said shutter is open;
 (k) the portion of said tubular member having said aperture being rotatable; and
 (l) means to rotate the rotatable portion of said tubular member as said circular gear is rotated to maintain said non-circular aperture aligned in a desired direction.

3. A camera capable of producing a plurality of commonly oriented images on a single frame of film, said plurality of images having centers substantially symmetrically disposed about the camera axis comprising:
(a) a light tight housing;
(b) means for transporting and storing a frame of film within said housing;
(c) a circular gear mounted within said housing for rotation in a plane normal to the axis of said camera with the axis of said circular gear lying along the axis of said camera;
(d) a first reflective device having a first reflective surface;
(e) means for mounting said first reflective device to said circular gear with said first reflective surface intersecting the axis of said camera;
(f) a second reflective device having a second reflective surface, means for mounting said second reflective device to said circular gear with said second reflective surface in parallel, spaced apart relation to said first reflective surface whereby light impinging on said first reflective surface is displaced from the axis of said camera;
(g) an aperture in said circular gear for permitting light passing through said shutter to impinge upon said frame of film;
(h) means for rotating said circular gear;
(i) means for indexing said gear as it is rotated;
(j) a shutter coupled to said housing for allowing light to impinge on said first reflective surface when open; and
(k) masking means positioned between said second reflective surface and said film for cooperating with said reflective device to provide commonly oriented images of selected size and non-circular configuration on said frame of film when said shutter is opened.

4. A camera as defined in claim 3 further including means effective responsive to rotation of said circular gear from one index position to the next index position for cocking said shutter.

5. A camera as defined in claim 4 wherein said means for rotating said gear comprises a gear train driven by a shaft which extends through said light tight housing.

6. A camera as defined in claim 4 further including means for indicating the angular position of said gear.

7. A camera lens system that comprises:
(a) a centrally disposed, normally closed shutter;
(b) means for momentarily opening such shutter to permit image transmitting light waves to impinge upon the sensitized surface of a frame of film;
(c) optical means positioned between said shutter and said film for displacing the light waves from the axis of the opening of such shutter;
(d) means for pivotally rotating said optical means about the axis of the opening of said shutter;
(e) means for indexing said optical means to desired angular positions as said optical means is rotated; and
(f) masking means cooperating with said optical means to provide commonly oriented images of selected size and configuration on said frame of film when said means for momentarily opening said shutter is actuated at different index positions of said optical means;
(g) said optical means comprising a first reflective device having a first reflective surface positioned in a plane extending obliquely across the axis of the opening of said shutter and a second reflective device having a second reflective surface in parallel, opposed, spaced apart relationship to said first reflective surface, and a focusing lens positioned between said first reflective surface and said second reflective surface.

8. A camera lens system that comprises:
(a) a centrally disposed, normally closed shutter;
(b) means for momentarily opening such shutter to permit image transmitting light waves to impinge upon the sensitized surface of a frame of film;
(c) optical means positioned between said shutter and said film for displacing the light waves from the axis of the opening of such shutter;
(d) means for pivotally rotating said optical means about the axis of the opening of said shutter;
(e) means for indexing said optical means to desired angular positions as said optical means is rotated; and
(f) masking means cooperating with said optical means to provide commonly oriented images of selected size and configuration on said frame of film when said means for momentarily opening said shutter is actuated at different index positions of said optical means;
(g) said optical means comprising a focusing lens positioned along the axis of the opening of said shutter, a first reflective device having a first reflective surface positioned in a plane extending obliquely across the axis of the opening of said shutter and a second reflective device having a second reflective surface in parallel, opposed, spaced apart relationship to said first reflective surface, said focusing lens being positioned in front of said first reflective surface.

References Cited by the Examiner
UNITED STATES PATENTS

| 475,919 | 5/1892 | Barril | 95—38 |
| 1,282,373 | 10/1918 | Browning | 95—38 |
| 2,883,903 | 4/1959 | Robinson | 95—44 X |

FOREIGN PATENTS

| 982,831 | 1/1951 | France. |

JOHN M. HORAN, *Primary Examiner.*
NORTON ANSHER, *Examiner.*